Aug. 23, 1949.  R. L. YOKE, JR  2,479,661

TOOLHOLDER

Filed March 13, 1948

Inventor
Robert L. Yoke Jr
By Buckhorn and Cheatham
Attorneys

Patented Aug. 23, 1949

2,479,661

UNITED STATES PATENT OFFICE 2,479,661

TOOLHOLDER

Robert L. Yoke, Jr., Portland, Oreg., assignor of one-fourth to Robert L. Yoke, Portland, Oreg.

Application March 13, 1948, Serial No. 14,680

14 Claims. (Cl. 279—53)

This invention relates to tool holders particularly adapted for receiving and holding the shanks, tangs or end portions of tools.

While the invention is not to be necessarily so limited, the tool holder is suitable for use in connection with such tools as files, knife blades, saw blades, chisels, screw drivers and the like. Holders or handles have been developed heretofore for use in connection with such tools but their usage has been more or less limited to certain specific types of tools and they have not been generally adapted for use with tools having shanks, tangs, or end portions of diverse sizes and shapes, such as round, flat, polygonal, parallel sided and tapered sided.

It is the general object of the present invention, therefore, to provide a new and improved tool holder which is capable of receiving and securely holding tools having shank, or end portions of a wide variety of different sizes and shapes.

A further object of my invention is to provide a tool holder including a pair of jaws and a mounting arrangement therefor whereby the jaws may be brought into firm gripping engagement with the end portion of a tool over a considerable length thereof irrespective of the cross-sectional shape or relative angular relation of the opposite surfaces of the tool end.

A still further object of the present invention is to provide a new and improved tool holder including a pair of jaws and a novel actuating mechanism therefor whereby the opposite end portions of the jaws are urged into gripping engagement with the end portion of the tool independently of each other.

A further object of the invention is to provide a new and improved tool holder of the class described consisting of relatively few parts of simple design and which are capable of inexpensive manufacture and quick assembly.

In accordance with the illustrated embodiment, my invention comprises a handle member having a longitudinal passage extending therethrough and a pair of similar opposed elongated jaws mounted within one end of said passage. Adjustment means are mounted in the opposite end of the handle and operatively connected to the jaws for adjustment thereof into and out of the aforementioned passage. A pair of guide means are arranged in a longitudinally spaced apart relation within the first mentioned end of the passage, each defining shoulders for cooperatively engaging adjacent portions of the jaws for causing movement of the opposite ends of the jaws relatively together as the jaws are adjusted inwardly of the passage by actuation of the adjustment means. The extent of relative movement of the opposite end portions of the jaws toward each other is determined by the relative angularity of the opposite surfaces of the tool end inserted therebetween. By virtue of the arrangement of parts, a firm gripping force is applied between longitudinally spaced points on the end of the tool inserted between the jaws and, furthermore, substantially independently of the relative angle of slope between the opposite surfaces of the tool end portion.

For a consideration of what is believed novel and inventive, attention is directed to the following description taken in connection with the accompanying drawings while the features of novelty will be pointed out with greater particularity in the appended claims.

In the drawings, Fig. 1 is a perspective view illustrating the tool holder constructed in accordance with one form of the present invention;

Figure 1:
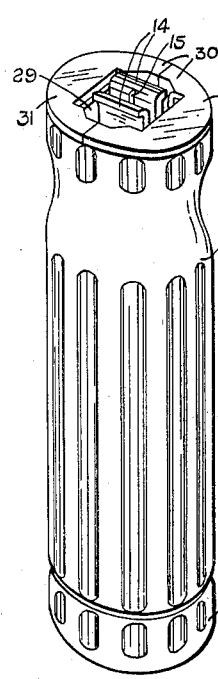

The tool holder illustrated includes a handle or body member 10 which may be of any suitable material such as, for example, wood or plastic and which is of a generally cylindrical configuration and provided with ribs or flutes on its outer surface to provide a more comfortable grip in the user's hand. The body member 10 is provided with a longitudinal passage 11 extending therethrough within which passage is mounted certain of the component parts of the holder mechanism.

A pair of jaws 14 are mounted within one end of the passage 11, the outermost ends of the jaws being outwardly flared for facilitating the insertion of an end portion of a tool therebetween. One of the jaws 14 is shown more clearly in the detail view of Fig. 7 and, by reference to which view, it will be noted that the jaw is substantially flat, though actually slightly curved in the longitudinal direction, and has a central longitudinal groove 15 and a plurality of transverse grooves 16 in the face thereof for providing improved gripping action against the surface of the tool. Opposite edge portions of the jaw 14 are cut away defining a pair of aligned shoulders 18 adjacent the upper end thereof and a pair of oppositely extending lugs 19 on the lower end of the jaw defining laterally extending shoulders 20 facing the lateral shoulders 18.

Adjustment means is provided on the end of the body member 10 opposite the jaws 14 and is operatively connected to the jaws for effecting adjustment thereof longitudinally of the passage 11. The adjustment means includes a knob 22 of substantially the same external diameter as the body member 10 and having a cylindrical portion 23 extending into a cooperating cylindrical bore provided in the end of the passage 11. Adjustment of the jaws 14 is effected by rotation of the knob 22 and, in order to reduce friction between the knob and the handle, a washer 24 of a suitable material, such as steel, is assembled about the cylindrical portion 23 of the knob and suitably secured in place such as by means of prongs 25 tightly engaging or penetrating the side walls of the portion 23.

Figure 2:
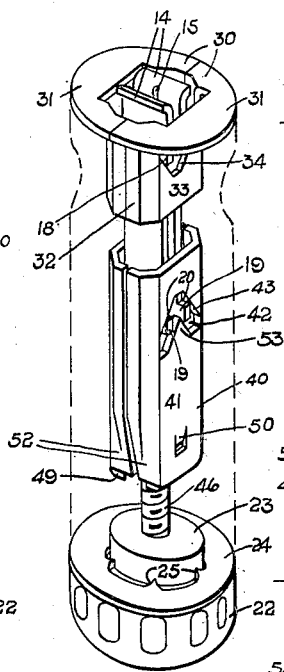
Fig. 2 is a phantom view in the same perspective as Fig. 1 but with the handle body removed in order to show various internal elements of the tool.
Figure 3:
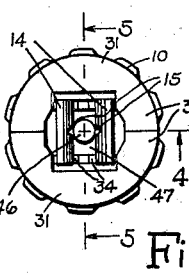
Fig. 3 is an upper end view of the holder shown in Fig. 1.
Figure 6:
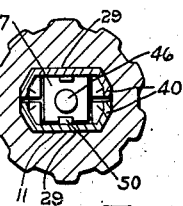
Fig. 6 is a cross-sectional view taken along the line 6—6 of Fig. 4.
Figure 8:
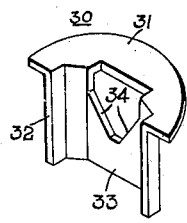
Fig. 8 is a view in perspective illustrating one of the guide elements incorporated in the tool holder.

A pair of guide means are arranged in a longitudinally spaced apart relation in the end of the passage in which the jaws 14 are mounted, which guide means are cooperatively engaged by the adjacent shoulder portions of the jaws whereby, upon longitudinal adjustment of the jaws into the handle, as when the end of a tool is to be mounted therebetween, the opposite end portions of the jaws are urged toward each other and into engagement with the adjacent surfaces of the tool. In the illustrated embodiment, each of the guide means defines pairs of converging shoulders, the shoulders of each of the guide means facing in a direction away from the other guide means and which shoulders are adapted to be engaged by the shoulders 18 and 20 of the jaws. In such instances where the body member 10 is made of relatively soft material such as wood or plastic, the first guide means, in the upper end of the handle, comprises a pair of similar steel inserts 30, one of which is illustrated in greater detail in Fig. 8. Each of the inserts 30 consists of a semicircular flange portion 31 and a right angularly extending skirt portion 32, the outer dimensions of the skirt portion and the shape thereof being such as to fit snugly in the assembled relation within the upper end of the passage 11. For reasons as will become apparent hereinafter, the passage 11 is of an elongated octagonal cross section having relatively wide opposite side walls 29, as shown more clearly in Fig. 6. The side wall portion 33 of the insert 30 is provided with a cutout defining a pair of converging shoulders 34 and which may be aptly described as a V shoulder facing outwardly of the passage within which the two inserts are mounted. The upper end portion of the cutout defining the V shoulder 34 extends horizontally into the horizontal flange portion 31 to provide clearance for the enlarged upper end portion of the jaws 14. The width of the jaws 14 is such that, when they are assembled in the holder as illustrated in Fig. 2, the shoulders 18 engage cooperatively against the V shoulders 34 of the inserts 30, the space between the side wall portions 33 of the inserts in the assembled relation being slightly greater than the width of the jaws between the shoulders 18 and 20.

Figure 4:
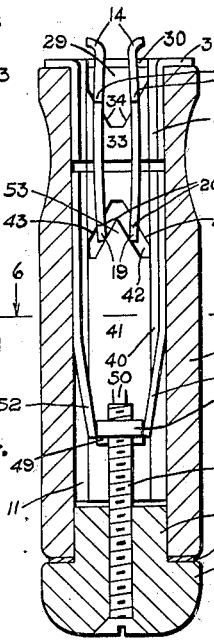
Fig. 4 is a longitudinal section view taken along the line 4—4 of Fig. 3.
Figure 5:
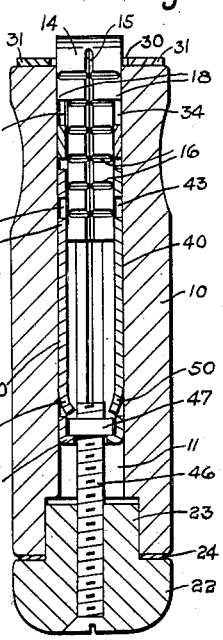
Fig. 5 is a longitudinal section view taken along the line 5—5 of Fig. 3.
Figure 9:
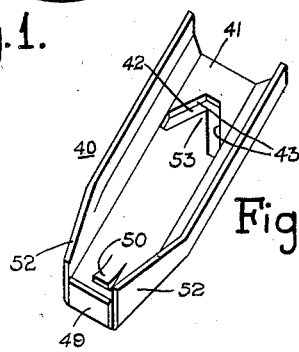
Fig. 9 is a view in perspective illustrating a further guide element incorporated in the tool holder.

The means operatively connecting the adjustment knob 22 and the lower ends of the jaws 14 includes a second guide means for effecting movement of the lower ends of the jaws relatively toward each other as the jaws are adjusted in a direction inwardly of the passage 11. This second guide means is in the form of a sleeve unit which surrounds the lower ends of the jaws 14 and, for convenience of manufacture, is made up of two similar channel shaped elements 40 one of which is shown in greater detail in Fig. 9. The sleeve unit comprising the two halves 40 is longitudinally slidable within the passage 11 and the outer cross-sectional shape thereof conforms generally to the polygonal cross-sectional configuration of the passage so that the sleeve unit will not rotate or twist therein. The relatively wide side wall portion 41 of each of the elements 40 is provided with a V shaped slot 42 defining a pair of converging shoulders 43 facing in the opposite direction with respect to the shoulders 34 of the inserts 30. The angle of slope of the shoulders 43 is preferably, though not necessarily, the same as that of the shoulders 34, while the width of the slots 42 is such as cooperatively to receive the laterally extending lug portions 19 of the jaws 14. As viewed in Figs. 2 and 4, it will be observed that the converging ends of the slots 42 extend toward the upper end of the passage 11 or toward first guide means defined by the inserts 30 as previously described. The interconnection between the sleeve unit and the knob 22 is effected by means of the screw 46 extending through the knob 22 and fixedly secured thereto, and the cooperating nut 47 assembled within the lower end of the sleeve unit. As shown, the nut 47 is square and is held in place between the inwardly bent flange portion 49 on the lower ends of each of the elements 40 and the inwardly struck out portions 50 of the same elements spaced above the flange portions 49 by a distance corresponding to the thickness of the nut 47. The opposite edge walls of the elements 40 are tapered inwardly at their lower ends, however, as indicated at 52, in order to define a square recess for more securely holding the nut 47 therewithin.

In the operation of the device, the knob 22 is unscrewed and the sleeve unit pushed thereby toward the upper end of the body member moving the jaws 14 outwardly of the passage. The pointed portion 53, see Fig. 4, formed by the V slots 42 extends between the lug portions 19 of the jaws tending to spread the inner ends of the jaws apart. The end portion of a tool, such as a shank or tang, may then be inserted between the jaws and the knob 22 may be turned to draw the nut 47 and the sleeve unit downwardly within the handle. The shoulders 18 of the jaws 14 riding upon the V shoulders 34 of the inserts 30 will, by cam action, force the upper end portions of the jaws toward each other and, similarly, the shoulders 20 of the lower ends of the jaws 14 riding upon the shoulders 43 of the V slots 42 will draw the lower ends of the jaws together.

Figure 7:
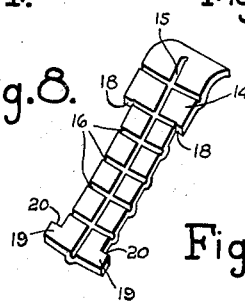
Fig. 7 is a view in perspective illustrating one of the jaws incorporated in the tool holder.
Figures 10, 11:
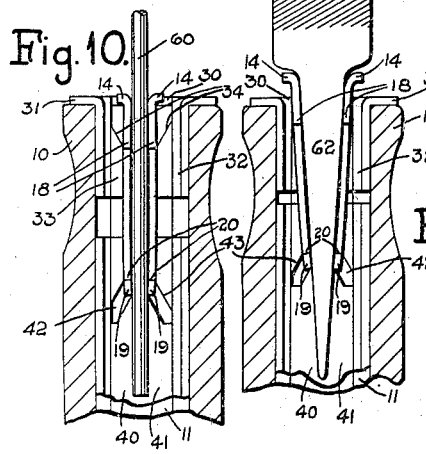
Fig. 10 is a fragmentary view illustrating the relative positions of parts of the tool holder with the end portion of a tool mounted therein.
Fig. 11 is a fragmentary detail view illustrating the relative position of parts with a different type of tool mounted therein than is illustrated therein in Fig. 10.

It will be observed that the movement of the upper end portions of the jaws relatively together will be independent of the relative movement together of the lower end portions of the jaws so that the jaws will automatically adjust themselves to the relative angularity of slope of the opposite surfaces of the tool element inserted therebetween. Referring to the explanatory fragmentary view of Fig. 10, a tool is shown mounted within the holder having a small diameter round rod-like end portion 60 the opposite surfaces of which are parallel with respect to each other so that the jaws 14 are brought into engagement with the opposite surfaces thereof in a parallel relation with respect to each other. For facilitating the gripping action upon a rounded surface such as that presented by the small diameter round rod tool end portion 60, the longitudinal grooves 15 provided on the face of the jaws prevent slippage of the tool transversely of the faces of the jaws. The longitudinal grooves 15 are also useful when a three-cornered or small square tang is inserted into the holder. In Fig. 11, the tang of a file 62 is shown inserted between the jaws of the tool holder, the opposite surfaces of the tang being disposed at an appreciable angle with respect to each other. The jaws of the tool holder are shown in the position which they will inherently occupy upon tightening of the knob 22 in firm engagement with each of the opposite sloping surfaces of the tang. With the jaws slightly curved in the longitudinal direction as shown in Fig. 7, gripping action upon the tool shank will be concentrated at the opposite end portions of the jaws.

Due to the cam action of the shoulders 18 and 20 upon the cooperating converging shoulders of the pairs of guide means provided within the handle passage, a relatively great force is imposed between the jaws and the surfaces of the tool portion inserted therebetween even with relatively slight effort impressed upon the knob 22 whereby the tool is held in a firmly gripped relation throughout usage of the tool.

Particular attention is directed to the fact that a tool end may be extended for a considerable length into the holder, beyond the lowermost ends of the jaws. This is of considerable importance since it enables a wide angle of adjustment of the length of the tool projecting from the holder. Furthermore, this construction enables usage of the holder with double ended tools such as screw driver bars, in which case one end of the bar may be shaped for use with slotted head screws and the other end shaped for cruciform recessed head screws. The functional head of such a bar may be inserted into the holder below the lower ends of the jaws and which jaws can then be tightened against the opposite sides of the bar beyond the bit end.

It will be obvious to those skilled in the art that the holder described may be economically manufactured and easily assembled. The handle body member 10 and the knob 22 may readily be molded out of plastic material, while the steel inserts 30, jaws 14, sleeve unit elements 40 and washer 24 may be stamped from sheet stock. The screw 46 and nut 47 may be conventional stock items.

Having described the invention in what is considered to be a preferred embodiment thereof, it is desired that it be understood that the specific details described are merely illustrative and that the invention may be carried out by other means without departing from the true spirit and scope of the invention.

I claim:

1. A tool holder comprising a body member, an elongated passage extending through said body member, a first guide means defining a pair of V shoulders arranged on opposite sides of said passage adjacent one end thereof, said shoulders facing outwardly of said passage, a pair of elongated jaws mounted in said passage adjacent said one end, each of said jaws having shoulders on each of the opposite sides thereof for cooperatively engaging against said V shoulders, a second guide means spaced from said first guide means comprising sleeve means slidably arranged in said passage having V slots formed therein on the opposite sides thereof and on the same sides of said passage as said V shoulders, the converging ends of said slots extending toward said first guide means, outwardly extending shoulders on the inner ends of said jaws extending cooperatively within said slots, and means mounted in the end of said passage opposite said one end for adjusting said second guide means longitudinally of said passage.

2. A tool holder comprising a body member, an elongated passage extending through said body member, a first guide means defining a pair of outwardly facing V shoulders on opposite sides of said passage adjacent one end thereof, a pair of elongated jaws mounted in said passage adjacent said one end and each having laterally extending shoulders on each of the opposite sides thereof for cooperatively engaging against said V shoulders, sleeve means in said passage having V slots formed therein on the opposite sides thereof and on the same sides of said passage as said V shoulders, the converging ends of said slots extending toward said first guide means, laterally extending shoulders on the inner ends of said jaws extending cooperatively within said V slots, and means mounted in the end of said passage opposite said one end for adjusting said sleeve means longitudinally of said passage.

3. A tool holder according to claim 2 and wherein said passage and said sleeve means are of similar polygonal cross-sectional shape whereby rotation of said sleeve means within said passage is precluded.

4. A tool holder according to claim 2 and wherein a nut is loosely mounted in one end of said sleeve means, said sleeve means including means cooperatively engaging said nut for restraining said nut against relative rotation with respect to said sleeve means, and said adjusting means includes a screw cooperatively threaded in said nut.

5. A tool holder comprising a body member, an elongated passage extending through said body member, a pair of similar cooperating opposed jaws mounted for longitudinal movement within one end of said passage, a guide means defining a pair of outwardly facing V shoulders on opposite sides of said passage adjacent said one end, said jaws each having portions on the opposite sides thereof cooperatively engaging against such V shoulders, said V shoulders causing movement of said jaws relatively together upon movement of said jaws into said passage, adjustment means mounted in the end of said passage opposite said one end and means operatively connecting said adjustment means and said pair of jaws for causing movement of said jaws longitudinally of said passage upon manipulation of said adjustment means.

6. A tool holder comprising a body member having an elongated passage extending therethrough, a pair of longitudinal opposed jaw members mounted within one end of said passage, manual adjustment means operatively connected to said jaw members and mounted in the end of said passage opposite said one end, said adjustment means being effective for moving said jaw members longitudinally of said passage, a pair of guide means arranged in a longitudinally spaced apart relation in said one end of said passage, each of said guide means including means defining oppositely disposed pairs of converging shoulders, the shoulders of each of said guide means facing away from the other of said guide means, inner and outer shoulders of each of said jaw members cooperatively engaging said shoulders whereby the inner and outer portions of said jaw members will be moved independently of each other relatively together upon inward movement of said jaw members into said passage and into firm engagement with opposite surfaces of a tool inserted therebetween irrespective of parallelism of such opposite surfaces.

7. A tool holder adapted for receiving the shank or tang of a tool the opposite surfaces of which may be either parallel or angularly disposed with respect to each other, said tool holder including a body member having a longitudinal passage therethrough, a pair of longitudinal opposed jaw members mounted in one end of said passage, adjustment means operatively connected to both of said jaw members mounted in the end of said passage opposite said one end, said adjustment means being effective for causing movement of said jaw members into and out of said passage and in a direction longitudinally thereof, a pair of guide means arranged in said one end of said passage and spaced apart longitudinally thereof, said guide means each defining pairs of converging shoulders, pairs of longitudinally spaced apart shoulders formed on each of the opposite sides of said jaw members for cooperatively engaging the shoulders of said guide means whereby upon adjustment of said jaw members into said passage both the inner and outer ends of said jaw members will be caused to move relatively toward each other and into engagement with adjacent surfaces of a tool or tang inserted therebetween.

8. A tool holder comprising a body member having an elongated passage extending therethrough, a pair of longitudinal opposed jaw members mounted within one end of said passage, adjustment means operatively connected to said jaw members and mounted in the end of said passage opposite said one end, said adjustment means being effective for moving said jaw members longitudinally of said passage, a pair of guide means arranged in a longitudinally spaced apart relation in said one end of said passage, each of said guide means including means defining pairs of converging shoulders, the shoulders of each of said guide means facing away from the other of said guide means, inner and outer portions of each of said jaw members being adapted for engaging said shoulders of said pair of guide means whereby said jaw members are caused to be shifted relatively together as said jaw members are moved into said passage by said adjustment means.

9. A tool holder comprising a body member, an elongated passage extending through said body member, a pair of similar substantially flat jaws mounted in said passage adjacent one end, an adjustment element mounted in the end of said passage opposite said one end, means cooperatively connecting said element to said jaws for causing adjustment of said jaws longitudinally of said passage, means on the outer ends of said jaws and cooperating first guide means for said last mentioned means adjacent said one end of said passage whereby said jaws are caused to move toward each other upon adjustment thereof into said passage, and second guide means for cooperatively engaging the inner ends of said jaws for causing movement of the inner ends of said jaws relatively together independently of the outer ends of said jaws upon adjustment of said jaws into said passage.

10. A tool holder comprising a body member, an elongated passage extending through said body member, a pair of opposed jaw members mounted within one end of said passage, adjustment means mounted within the end of said passage opposite said one end and operatively connected to both of said jaw members for causing movement of said jaw members in either direction longitudinally of said passage, a pair of guide means arranged in a longitudinally spaced apart relation within said one end of said passage and adapted for cooperative engagement by spaced apart portions of each of said jaw members, said guide means each comprising means defining pairs of converging shoulders whereby the inner and outer portions of said jaw members are caused to move relatively together upon adjustment of said jaw members into said passage by said adjusting means.

11. A tool holder comprising a body member, an elongated passage extending through said body member, a pair of opposed cooperating jaw members mounted within one end of said passage, adjustment means cooperatively connected to both of said jaw members mounted in the end of said passage opposite said one end, a first guide means arranged adjacent said one end of said passage and a second guide means arranged within said passage and spaced from said one end, portions on both of said jaw members cooperatively engaging both said first and said second guide means for causing a movement of the inner and outer portions of said jaw members relatively together and independently of each other upon movement of said jaw members into said passage by said adjustment means.

12. A tool holder according to claim 11 and in which said first guide means is defined by a pair of substantially similar steel members fitted into said one end of said passage.

13. A tool holder according to claim 11 and wherein the second guide means is defined by a sleeve unit consisting of two cooperating channel shaped elements.

14. A tool holder according to claim 11 and wherein said first guide means is fixedly mounted in said one end of said passage and said second guide means is slidably arranged within said passage.

ROBERT L. YOKE, Jr.

REFERENCES CITED

The following references are of record in the file of this patent:

UNITED STATES PATENTS

| Number | Name | Date |
| --- | --- | --- |
| 337,245 | Chantrell | Mar. 2, 1886 |
| 742,640 | Harold | Oct. 27, 1903 |
| 748,439 | Twopig | Dec. 29, 1903 |
| 756,732 | Tappan | Apr. 5, 1904 |
| 1,583,967 | Epps | May 11, 1926 |